(12) United States Patent
Fraysure, III et al.

(10) Patent No.: US 9,444,304 B2
(45) Date of Patent: Sep. 13, 2016

(54) GENERATOR SET HAVING ADJUSTABLE TERMINAL BOX

(71) Applicant: Caterpillar Inc., Peoria, IL (US)

(72) Inventors: Paul Winfred Fraysure, III, Griffin, GA (US); James Joseph McIver, Stockbridge, GA (US); Ryan Arden White, Stockbridge, GA (US); Michael David Pitts, McDonough, GA (US)

(73) Assignee: Caterpillar Inc., Peoria, IL (US)

( * ) Notice: Subject to any disclaimer, the term of this patent is extended or adjusted under 35 U.S.C. 154(b) by 109 days.

(21) Appl. No.: 14/336,141

(22) Filed: Jul. 21, 2014

(65) Prior Publication Data

US 2016/0020666 A1 Jan. 21, 2016

(51) Int. Cl.
*H02K 5/22* (2006.01)
*H02K 7/18* (2006.01)

(52) U.S. Cl.
CPC ............ *H02K 5/225* (2013.01); *H02K 7/1807* (2013.01)

(58) Field of Classification Search
CPC .. F02B 63/04; F02B 2063/045; F02B 75/16; F03G 7/08; H02K 35/02; H02K 5/15; H02K 5/225; H02B 5/00; H02B 13/02
USPC .......... 290/1 A, 1 R; 310/89, 68 D; 361/603, 361/641, 600
See application file for complete search history.

(56) References Cited

U.S. PATENT DOCUMENTS

| | | | | |
|---|---|---|---|---|
| 1,930,156 A * | 10/1933 | Ernst | ......................... | H02B 1/00 361/603 |
| 2,762,938 A * | 9/1956 | Newbold | ............. | G05D 7/0635 236/15 BR |
| 3,175,125 A * | 3/1965 | Brown | ................... | H01R 23/10 361/626 |
| 3,489,911 A * | 1/1970 | Varner | ..................... | F02B 63/04 174/535 |
| 3,843,909 A * | 10/1974 | Asselborn | ................ | H02B 1/52 174/541 |
| 4,128,871 A * | 12/1978 | Murad | .................. | H01L 25/117 257/E25.027 |
| 4,165,443 A * | 8/1979 | Figart | ...................... | H02G 3/16 174/53 |
| 4,249,227 A * | 2/1981 | Kato | ........................ | H02B 3/00 361/606 |
| 4,823,022 A * | 4/1989 | Lindsey | ................. | G01R 15/14 174/139 |
| 5,788,529 A * | 8/1998 | Borzi | ................... | H01R 9/2458 29/830 |
| 7,365,964 B2 * | 4/2008 | Donahue, IV | ....... | H01R 13/514 174/50 |
| 7,978,460 B2 * | 7/2011 | Dykes | .................... | H02K 5/225 174/50.52 |

(Continued)

FOREIGN PATENT DOCUMENTS

| | | |
|---|---|---|
| CN | 2010/37435 Y | 3/2008 |
| FR | 2979766 | 3/2013 |

(Continued)

*Primary Examiner* — Tulsidas C Patel
*Assistant Examiner* — Charles Reid, Jr.
(74) *Attorney, Agent, or Firm* — Finnegan, Henderson, Farabow, Garrett & Dunner, LLP

(57) ABSTRACT

A terminal box for a generator set is disclosed. The terminal box may include a generally open structural member configured to be mounted to a generator barrel of the generator set. The structural member may have a first end and a second end that is wider than the first end. When the structural member is mounted to the generator barrel in a first orientation, the second end may be located at a first position relative to the generator set. When the structural member is mounted to the generator barrel in a second orientation, the second end may be located at a second position relative to the generator set.

16 Claims, 4 Drawing Sheets

(56) References Cited

U.S. PATENT DOCUMENTS

| | | | | |
|---|---|---|---|---|
| 8,450,864 B2* | 5/2013 | Kawakita | | F02B 63/04 290/1 A |
| 8,963,348 B2* | 2/2015 | Kawakita | | F02B 63/044 123/2 |
| 2008/0140546 A1* | 6/2008 | Finley | | G06F 17/50 705/29 |
| 2008/0185801 A1* | 8/2008 | Gravlin | | B62B 3/02 280/47.11 |
| 2009/0065248 A1* | 3/2009 | Finley | | H02K 5/22 174/541 |
| 2009/0066270 A1* | 3/2009 | Dause | | H05K 7/1432 318/34 |
| 2010/0090635 A1* | 4/2010 | Andersen | | F04D 29/426 318/490 |
| 2010/0102684 A1* | 4/2010 | Dykes | | H02K 5/225 310/68 R |
| 2010/0127602 A1* | 5/2010 | Rueggen | | H02K 11/0073 310/68 D |
| 2010/0159754 A1* | 6/2010 | Bruza | | H01R 4/28 439/796 |
| 2012/0168023 A1 | 7/2012 | Folken et al. | | |
| 2013/0026844 A1* | 1/2013 | Mitsuoka | | H02J 3/383 307/82 |
| 2013/0106218 A1 | 5/2013 | Vohlgemuth | | |
| 2015/0241085 A1* | 8/2015 | Justus | | F24H 1/06 290/2 |

FOREIGN PATENT DOCUMENTS

| | | |
|---|---|---|
| FR | 2992794 | 1/2014 |
| WO | WO 2013/014570 | 1/2013 |

\* cited by examiner

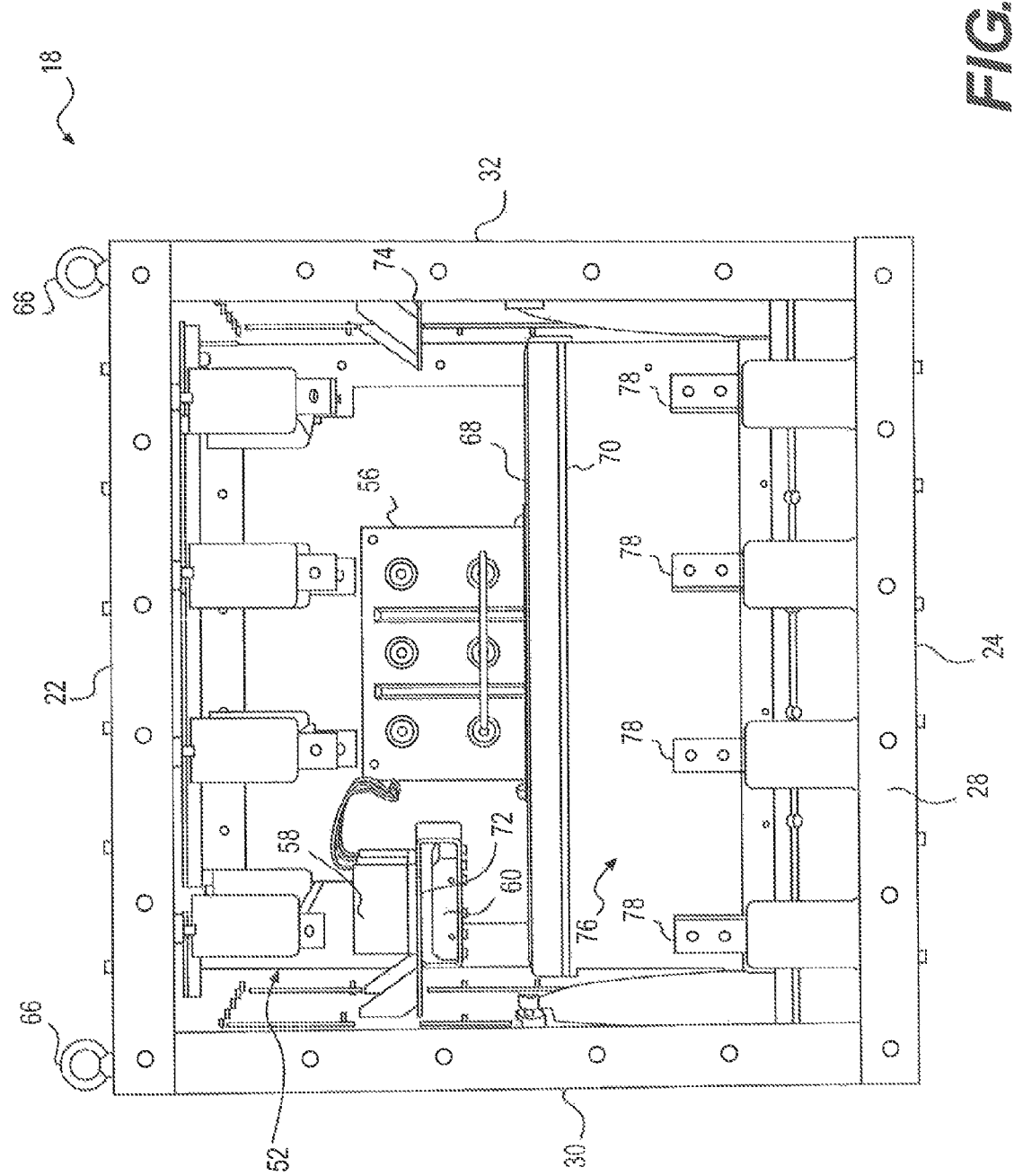

GENERATOR SET HAVING ADJUSTABLE TERMINAL BOX

TECHNICAL FIELD

The present disclosure is directed to a generator set and, more particularly, to a generator set having an adjustable terminal box.

BACKGROUND

A generator set includes a combination of a generator and a prime mover, for example a combustion engine. The generator and the prime mover are mounted together along with other accessories on an anchor platform to form an integral unit commonly known as a genset. As fuel is burned within the prime mover, a mechanical rotation is created that drives the generator to produce electrical power. A terminal box is typically included within the genset and houses electronics used to monitor and control genset operation, such that the electrical power is produced in a desired manner to have particular characteristics. For example, the terminal box may house transformers, voltage regulators, terminal strips, and customer connection points including, for example, bus bars and circuit breakers, for electrically connecting an external load to the genset.

An example of an electric machine having a terminal box is disclosed in U.S. Patent Application Publication No. US 2013/0106218 published to Vohlgemuth on May 2, 2013 (the '218 publication). In particular, the '218 publication discloses an electric machine and a two-piece terminal box attached to the electric machine. The terminal box includes two half-shells that are assembled through corresponding male and female portions. The terminal box serves to connect electric cables outside the electric machine and house a regulator and/or a variator.

Although the terminal box of the '218 publication may be suitable for some applications, it still may be less than optimal. In particular, there is limited space within the terminal box of the '218 publication, and thus, some control components associated with the electric machine would need to be mounted external to the terminal box. Further, the terminal box of the '218 publication only has a single mounting orientation with respect to the electric machine, which limits an operator's design flexibility for different worksite requirements. In addition, having a two-piece terminal box can increase complexity as well as costs associated with assembling the terminal box.

The generator set of the present disclosure solves one or more of the problems set forth above and/or other problems in the art.

SUMMARY

In one aspect, the present disclosure is directed toward a terminal box for a generator set. The terminal box may include a generally open structural member configured to be mounted to a generator barrel of the generator set. The structural member may have a first end and a second end that is wider than the first end. When the structural member is mounted to the generator barrel in a first orientation, the second end may be located at a first position relative to the generator set. When the structural member is mounted to the generator barrel in a second orientation, the second end may be located at a second position relative to the generator set.

In another aspect, the present disclosure is directed toward a terminal box for a generator set. The terminal box may include a generally open structural member configured to be mounted to a generator barrel of the generator set. The structural member may have a first face plate, a second face plate opposite the second face plate, a first side plate, and a second side plate opposite the first side plate. The terminal box may also include a first shelf mounted to the first face plate, a second shelf mounted to the second face plate, a third shelf mounted to the first side plate, and a fourth shelf mounted to the second side plate. The terminal box may further include a first transformer mounted on one of the first and second shelves, and a second transformer mounted on one of the third and fourth shelves.

In yet another aspect, the present disclosure is directed toward a generator set. The generator set may include a prime mover, a generator configured to be driven by the prime mover to create electrical power, and an anchor platform connecting the prime mover to the generator. The generator set may also include a customer connection, and a terminal box configured to transmit the electrical power to the customer connection and to regulate the creation of electrical power. The terminal box may include a generally open structural member configured to be mounted to a generator barrel of the generator set. The structural member may have a first face plate, a second face plate opposite the second face plate, a first end, and a second end that is wider than the first section. The terminal box may also include a first shelf mounted to the first face plate, a second shelf mounted to the second face plate, and a transformer mounted on one of the first and second shelves. When the structural member is mounted to the generator barrel in a first orientation, the second end may be located at a first position relative to the generator set. When the structural member is mounted to the generator barrel in a second orientation, the second end may be located at a second position relative to the generator set.

BRIEF DESCRIPTION OF THE DRAWING

FIG. 4 is a second side-view pictorial illustration of the terminal box of FIG. 2.

DETAILED DESCRIPTION

Figure 1:
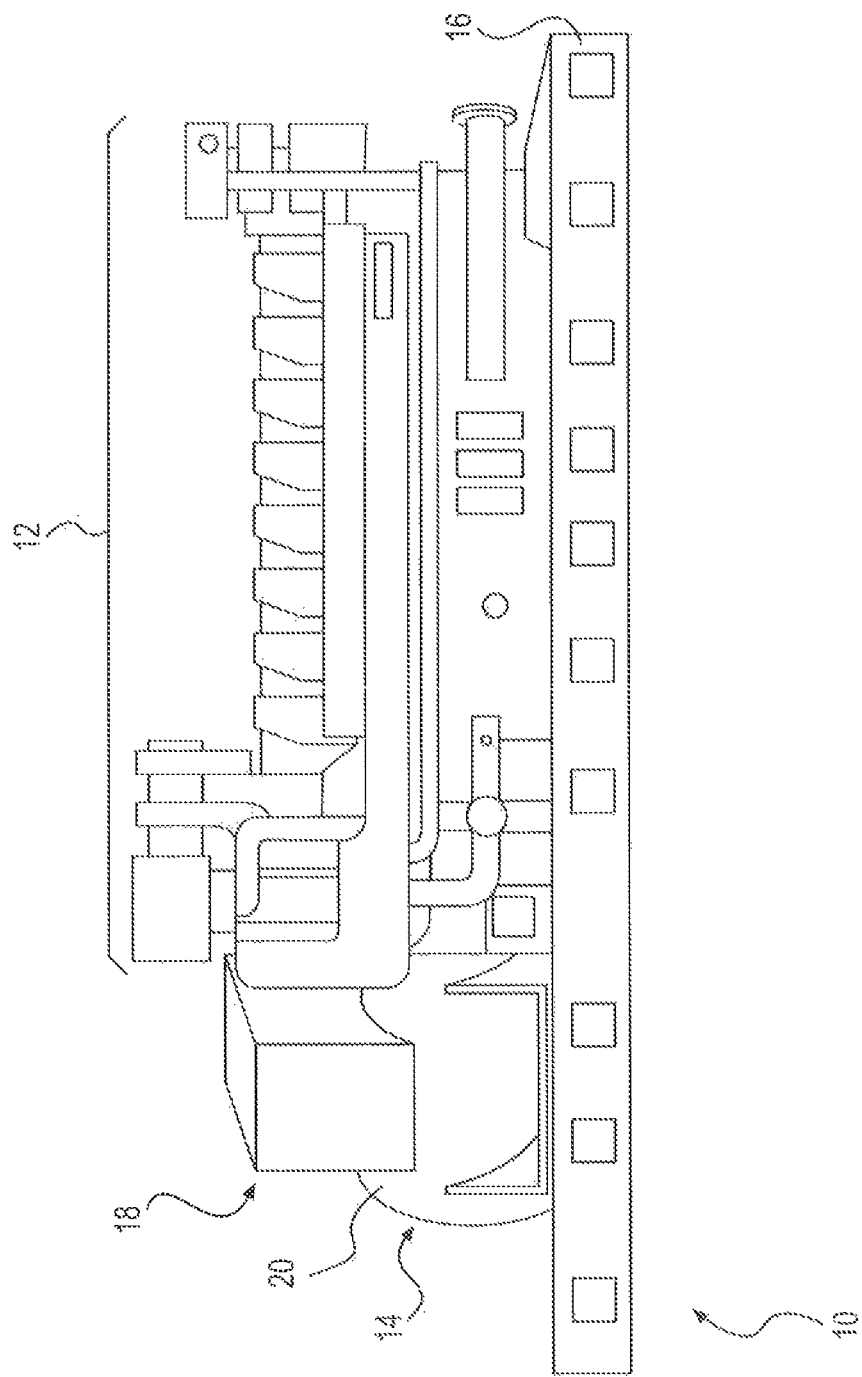
FIG. 1 is a pictorial illustration of an exemplary disclosed generator set.

FIG. 1 illustrates a generator set (genset) 10 having a prime mover 12 coupled to mechanically rotate a generator 14. For the purposes of this disclosure, prime mover 12 is depicted and described as a heat engine, for example, a combustion engine that combusts a mixture of fuel and air to produce the mechanical rotation. One skilled in the art will recognize that prime mover 12 may be any type of combustion engine such as, for example, a diesel engine, a gasoline engine, or a gaseous fuel-powered engine. Generator 14 may be, for example, an AC induction generator, a permanent-magnet generator, an AC synchronous generator, or a switched-reluctance generator. In one embodiment, generator 14 may include multiple pairings of poles (not shown), each pairing having three phases arranged on a circumference of a stator (not shown) to produce an alternating current with a frequency of 50 and/or 60 Hz. Electrical power produced by generator 14 may be directed for offboard purposes by way of one or more generator bus bars (not shown). Prime mover 12 and generator 14 may each be rigidly mounted to an anchor platform or rails 16 (only one shown in FIG. 1).

Genset 10 may also include a terminal box 18 mounted to generator 14 and in communication with prime mover 12 and/or generator 14 to monitor and regulate an electrical output of genset 10. Specifically, terminal box 18 may be mounted to an outer casing (e.g., barrel) 20 of generator 14. In one embodiment, terminal box 18 may be a one-piece enclosure fabricated from stamped sheet metal that houses one or more electrical connection components along with one or more monitoring or control components.

Figure 2:
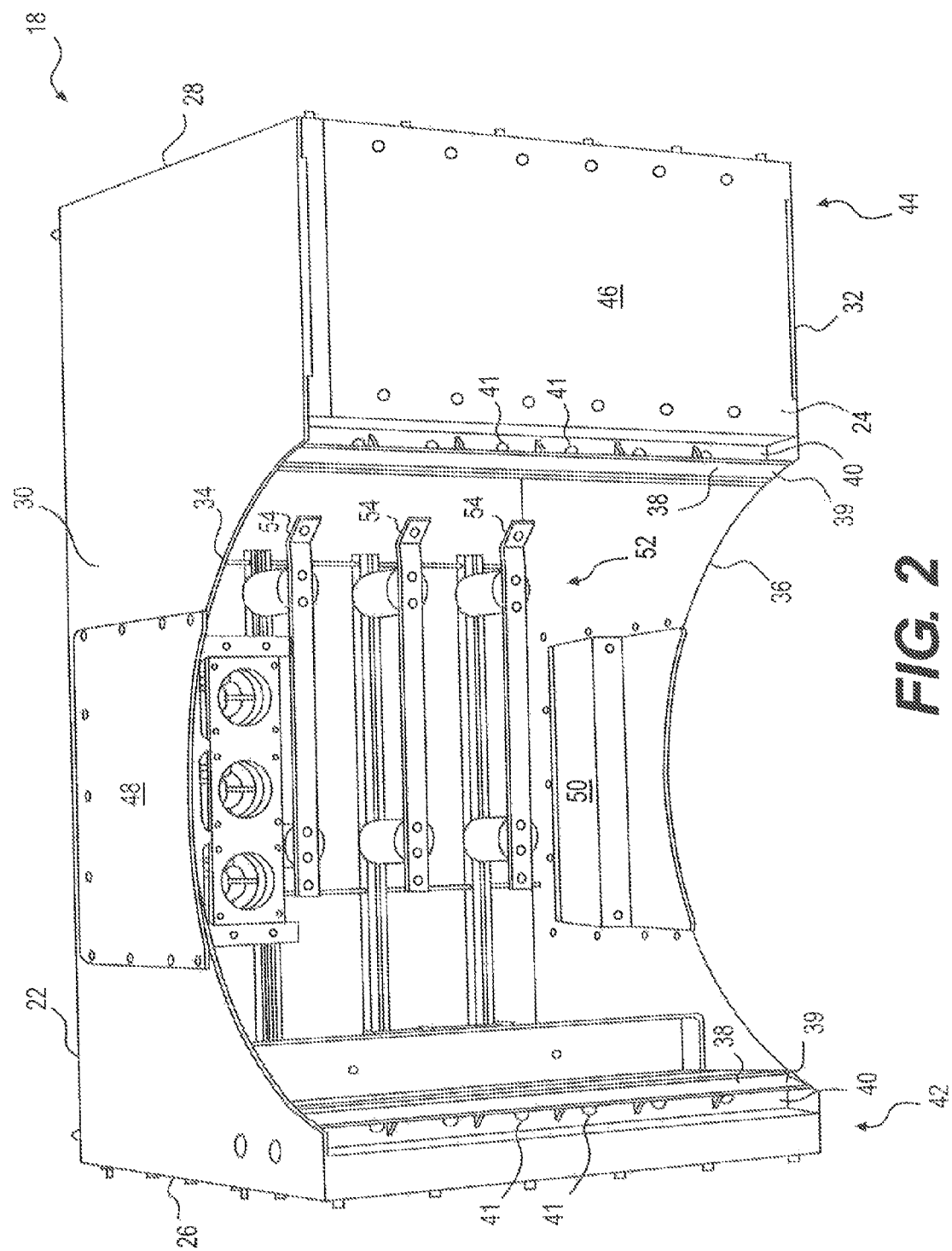
FIG. 2 is a bottom-view pictorial illustration of an exemplary disclosed terminal box that may be used with the generator set of FIG. 1.

As shown in FIG. 2, terminal box 18 may embody a generally open structural member configured to receive generator 14. More specifically, terminal box 18 may be substantially rectangular with a semicircular cutout that is configured to receive barrel 20 of generator 14. Terminal box 18 may include a top plate 22 oriented generally upward with respect to gravity, a bottom plate 24 that engages generator 14, and opposing side plates 26, 28. Terminal box 18 may also include a first face plate 30 and an oppositely disposed second face plate 32. As will be discussed in greater detail below, either face plate 30 or face plate 32 may be oriented towards prime mover 12, depending on an orientation of terminal box 18. It should be noted that face plates 30, 32 may be substantially parallel and opposite to one another, and may be generally perpendicular to top plate 20, bottom plate 24, and side surfaces 26, 28.

Face plates 30, 32 may include curved surfaces 34, 36, respectively, defining the semicircular cutout. Each surface 34, 36 may be configured to engage an outer perimeter of barrel 20 after terminal box 18 is mounted to barrel 20. Terminal box 18 may be equipped with one or more mounting rails 38 configured to secure terminal box 18 to barrel 20. In one embodiment, mounting rail 38 may be welded to barrel 20 prior to assembly. In another embodiment, mounting rail 38 may be bolted to barrel 20 prior to assembly. In the disclosed embodiment, two mounting rails 38 are connected to bottom plate 24 during assembly; one mounting rail 36 located on either side of the semicircular cutout. Each mounting rail 38 may have a curved portion 39 that is configured to receive barrel 20, and a horizontal portion 40 that is substantially horizontal with respect to a ground surface. In one embodiment, curved portion 39 may intersect with horizontal portion 40 at an angle of about 70°. Horizontal portion 40 may include a plurality of holes 41 configured to receive a plurality of fasteners (not shown), such as, for example, bolts to secure terminal box 18 to barrel 20. In one embodiment, the plurality of fasteners may be inserted vertically into holes 41 during assembly.

Terminal box 18 may also include a first end (narrow end) 42 and a second end (wide end) 44 that is wider than narrow end 42. Narrow and wide ends 42, 44 may be located at either side of semicircular cutout towards sides plates 26, 28, respectively. In some embodiments, wide end 44 may have a substantially larger interior volume than narrow end 42. As a result, wide end 44 may be capable of housing more components within terminal box 18, but also occupy more space at a worksite.

Terminal box 18 may further include one or more panels that can be selectively removed to provide access to various components housed within terminal box 18. The panels may also assist an operator during assembly of terminal box 18. For example, a first panel 46 may be connected to bottom plate 24 at wide end 44. A second panel 48 may be connected to face plate 30 at a location above generator 14. A third panel 50 may be connected to face plate 32 at a location above generator 14 opposite panel 48. It is contemplated that one or more additional panels may be provided at different locations of terminal box 18, if desired. In some embodiments, each panel 46, 48, 50 may be bolted to its respective plate of terminal box 18. It is contemplated, however, that instead of removable panels 46, 48, 50, doors may be used to facilitate assembly.

Terminal box 18 may house at least one customer connection mounted therein to facilitate the transmission of power from generator 14 to an external customer load (not shown). In particular, a first customer connection 52 may be mounted to top plate 22. First customer connection 52 may embody one or more bus bars 54 to which an operator of genset 10 (i.e., a customer) may connect the external load to receive power. One or more electrical connection components may also be housed within terminal box 18, including, among other things, one or more breakers (not shown) and a plurality of associated breaker bus bars (not shown). After assembly of terminal box 18, a plurality of generator bus bars and/or cables (not shown) may extend from the generator to the breaker bus bars, and from the breaker bus bars to customer bus bars 54.

Figure 3:
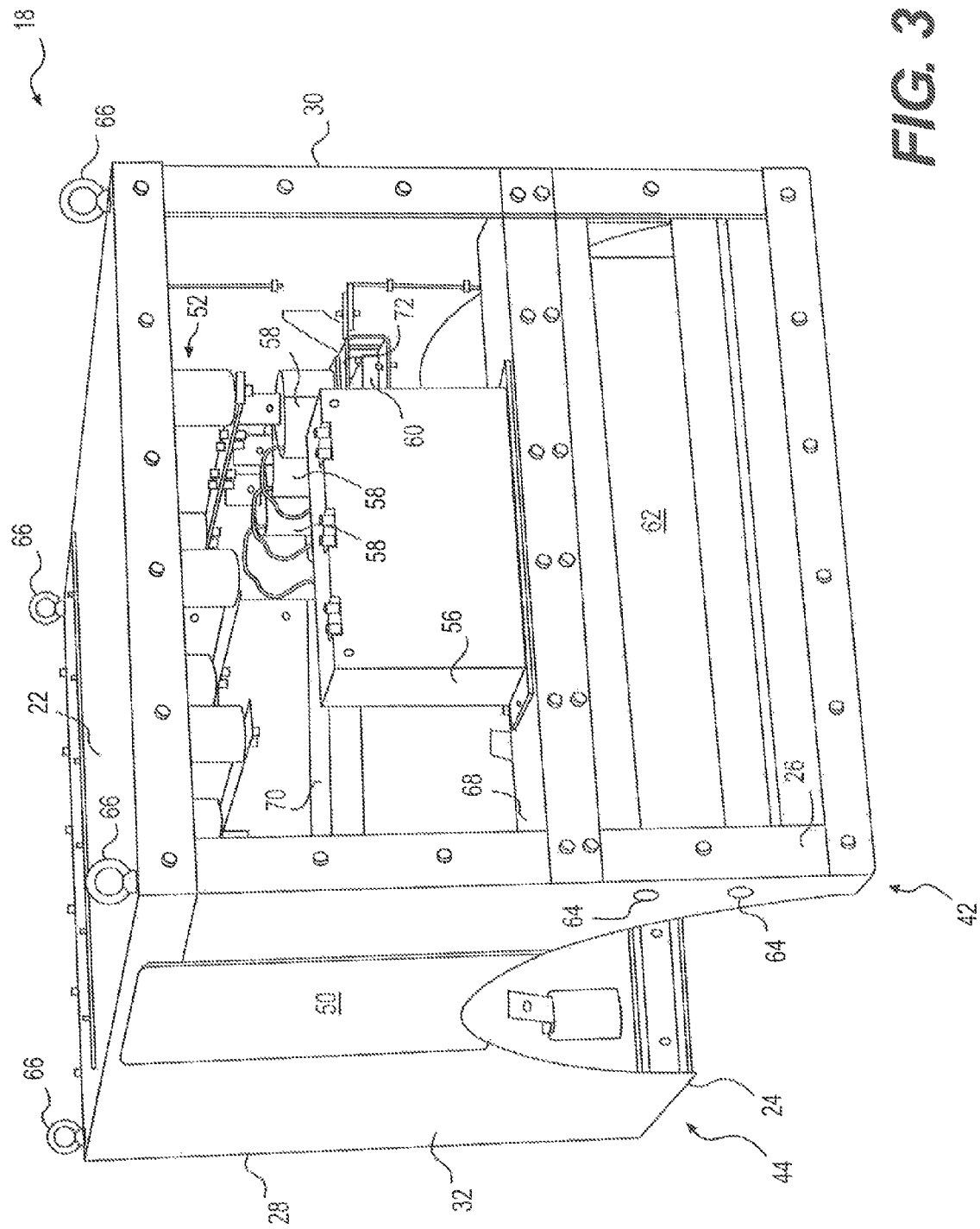
FIG. 3 is a first side-view pictorial illustration of the terminal box of FIG. 2.

As shown in FIG. 3, terminal box 18 may also house one or more control components. In one embodiment, the control components may include, for example, a potential transformer 56, a differential current transformer 58, and a metering current transformer 60. Potential transformer 56 may be a three-phase transformer configured to regulate voltage to be transferred from generator 14 to the customer loads. Differential current transformer 58 may be configured to regulate current to be transferred from generator 14 to the customer loads. Metering current transformer 60 may be configured to monitor current to be transferred from generator 14 to the customer loads. In addition to these control components, terminal box 18 may also include one or more additional control components (not shown), including a digital voltage regulator, one or more annunciators, a remote temperature detector, a remote communications device, one or more terminal strips, an electronic governor, a load sharing module, and other similar components. In one embodiment, these additional control components may be housed in a lower compartment 62 positioned below potential transformer 56 with respect to gravity. One or more customer connections 64 may be located in face plates 30, 32 to connect customer loads to the terminal strips. Additionally, terminal box 18 may be equipped with one or more removable lifting eyes 66 to facilitate lifting terminal box 18 and mounting it to barrel 20.

In the disclosed embodiment, terminal box 18 is adjustable, such that an operator may change an orientation of terminal box 18, depending on various worksite requirements and operator preferences. For example, terminal box 18 may be mounted to barrel 20 in a first orientation with face plate 30 oriented towards prime mover 12 and wide section 44 positioned on a first side of genset 10. Alternatively, terminal box 18 may be mounted to barrel 20, in a second orientation, with face plate 32 oriented towards prime mover 12 and wide section 44 positioned on a second side of genset 10 opposite to the first side. An operator may change between the first and second orientations by removing the plurality of fasteners from holes 41, lifting and rotating terminal box 18 180° via lifting eyes 66, and remounting terminal box 18 to barrel 20. By providing the option of changing the orientation of terminal box 18, this may allow an operator to choose how to position terminal box 18 relative to genset 10 at a worksite. For example, in some situations, it may be beneficial to have wide end 44 located on one side of genset 10 compared to the other side. For instance, when space is limited on one side of genset 10, an operator may position wide end 44 on the other side. When a greater number of customer connections are required on one side of genset 10 and space is not an issue, then an operator may position wide end 44 on that side of genset 10.

In some embodiments, terminal box 18 may include one or more shelves to mount the control components thereon. For example, in one embodiment, a first shelf 68 may be mounted to side plate 26 at narrow end 42 and provide a mounting surface for potential transformer 56. In addition, a second shelf 70 may be mounted to side plate 28 at wide end 44 and also provide a mounting surface for potential transformer 56. Depending on the worksite requirements and/or the operator's preferences, potential transformer 56 may be mounted to either shelf 68, 70 in order to position potential transformer 56 on either side of genset 10. For example, depending on whether terminal box 18 is mounted in the first or second orientation, potential transformer 56 may be mounted to either shelf 68, 70. In either positioning, space above and below shelves 68, 70 may be utilized to mount various other electrical and control components associated with terminal box 18.

As shown in FIGS. 3 and 4, similar to shelves 68, 70, a third shelf 72 and a fourth shelf 74 may both provide mounting surfaces for differential current transformer 58 and metering current transformer 60. Shelf 72 may be mounted to face plate 30, while fourth shelf 74 may be mounted to face plate 32. Also depending on the worksite requirements and/or the operator's preferences, differential current transformer 58 and metering current transformer 60 may be mounted to either shelf 72, 74 in order to position the components closer to or further away from prime mover 12.

As shown in FIG. 4, in addition to first customer connection 52, terminal box 18 may include a second customer connection 76 mounted to bottom plate 24. The second customer connection 76 may include one or more bus bars 78 to which the customer connects the external load to receive power. Similar to first customer connection 52, after assembly of terminal box 18, a plurality of generator bus bars and/or cables (not shown) may extend from the generator to the breaker bus bars, and from the breaker bus bars to customer bus bars 78. It is contemplated that, in some embodiments, one or both of first and second customer connections 52, 76 may be provided depending on worksite requirements and operator preferences. Having both first and second customer connections 52, 76 may allow more customer connections, in particular, on both top and bottom portions of terminal box 18. On the other hand, having only one customer connection 52, 72 may save space within terminal box 18 for other components.

INDUSTRIAL APPLICABILITY

The disclosed terminal box may be implemented into any power system application. For example, although particularly suited for a genset application, the disclosed terminal box may be utilized in conjunction with any application requiring simplified housing for electrical connection and control components. The disclosed terminal box may be a one-piece housing that is adjustable between different orientations depending on worksite requirements and operator preferences. The adjustability of the disclosed terminal box may also allow multiple designs to be combined into one universal design. In addition, the disclosed terminal box may efficiently utilize space within the terminal box by incorporating one or more shelves and utilizing space above and below the shelves, without wasting significant space within the terminal box.

It will be apparent to those skilled in the art that various modifications and variations can be made to the disclosed generator set. Other embodiments will be apparent to those skilled in the art from consideration of the specification and practice of the disclosed generator set. It is intended that the specification and examples be considered as exemplary only, with a true scope being indicated by the following claims and their equivalents.

What is claimed is:

1. A terminal box for a generator set, comprising:
a generally open structural member configured to be mounted to a generator barrel of the generator set, the structural member having a first end and a second end that is wider than the first end,
wherein:
when the structural member is mounted to the generator barrel in a first orientation, the second end is located at a first position relative to the generator set; and
when the structural member is mounted to the generator barrel in a second orientation, the second end is located at a second position relative to the generator set; and
wherein:
the terminal box further including at least one mounting rail configured to mount the structural member to the generator barrel, wherein the at least one mounting rail includes two mounting rails configured to mount at the first and second ends and wherein the at least one mounting rail has a curved portion configured to engage an outer perimeter of the generator barrel, and a horizontal portion having holes configured to receive a plurality of fasteners for mounting the structural member to the generator barrel.

2. The terminal box of claim 1, wherein the structural member is rotated 180° when switching between the first and second orientations.

3. The terminal box of claim 1, further including: a first shelf mounted to a first face plate of the structural member; and a second shelf mounted to a second face plate of the structural member opposite the first face plate.

4. The terminal box of claim 3, further including a transformer mounted on one of the first and second shelves.

5. The terminal box of claim 4, further including: a third shelf mounted to a first side plate of the structural member; and a fourth shelf mounted to a second side plate of the structural member opposite the first side plate.

6. The terminal box of claim 5, wherein the transformer is a first transformer, and the terminal box further includes a second transformer mounted on one of the third and fourth shelves.

7. The terminal box of claim 6, further including a third transformer mounted below the second transformer on one of the first and second shelves.

8. The terminal box of claim 1, further including a first customer connection mounted to a top plate of the structural member, and a second customer connection mounted to a bottom plate of the structural member.

9. The terminal box of claim 1, further including at least one removable lifting eye mounted on a top plate of the structural member.

10. The terminal box of claim 1, further including: a first removable panel connected to a first face plate of the structural member; and a second removable panel connected to a second face plate of the structural member opposite the first face plate.

11. A terminal box for a generator set, comprising:
  a generally open structural member configured to be mounted to a generator barrel of the generator set, the structural member having:
    a first face plate;
    a second face plate opposite the first face plate;
    a first side plate; and
    a second side plate opposite the first side plate;
    a first shelf mounted to the first face plate;
    a second shelf mounted to the second face plate;
    a third shelf mounted to the first side plate;
    a fourth shelf mounted to the second side plate;
    a first transformer mounted on one of the first and second shelves;
    a second transformer mounted on one of the third and fourth shelves; and
    at least one mounting rail configured to mount the structural member to the generator barrel, the at least one mounting rail having a curved portion configured to engage an outer perimeter of the generator barrel, and a horizontal portion having holes configured to receive a plurality of fasteners for mounting the structural member to the generator barrel.

12. The terminal box of claim 11, wherein the structural member includes: a first end; and a second end that is wider than the first end.

13. The terminal box of claim 12, wherein: when the structural member is mounted to the generator barrel in a first orientation, the second end is located at a first position relative to the generator set; and when the structural member is mounted to the generator barrel in a second orientation, the second end is located at a second position relative to the generator set.

14. The terminal box of claim 11, further including a third transformer mounted below the second transformer on one of the first and second shelves.

15. The terminal box of claim 11, further including a first customer connection mounted to a top plate of the structural member, and a second customer connection mounted to a bottom plate of the structural member.

16. A generator set, comprising:
  a prime mover;
  a generator configured to be driven by the prime mover to create electrical power;
  an anchor platform connecting the prime mover to the generator;
  a customer connection; and
  a terminal box configured to transmit the electrical power to the customer connection and to regulate the creation of electrical power, the terminal box including:
    a generally open structural member configured to be mounted to a generator barrel of the generator set, the structural member having a first face plate, a second face plate opposite the first face plate, a first end, and a second end that is wider than the first end;
    a first shelf mounted to the first face plate;
    a second shelf mounted to the second face plate; and
    a transformer mounted on one of the first and second shelves,
  wherein:
    when the structural member is mounted to the generator barrel in a first orientation, the second end is located at a first position relative to the generator set; and
    when the structural member is mounted to the generator barrel in a second orientation, the second end is located at a second position relative to the generator set; and
  wherein:
    the terminal box further including at least one mounting rail configured to mount the structural member to the generator barrel, wherein the at least one mounting rail includes two mounting rails configured to mount at the first and second ends and wherein the at least one mounting rail has a curved portion configured to engage an outer perimeter of the generator barrel, and a horizontal portion having holes configured to receive a plurality of fasteners for mounting the structural member to the generator barrel.

* * * * *